(12) United States Patent
Wang

(10) Patent No.: US 7,082,553 B1
(45) Date of Patent: Jul. 25, 2006

(54) METHOD AND SYSTEM FOR PROVIDING RELIABILITY AND AVAILABILITY IN A DISTRIBUTED COMPONENT OBJECT MODEL (DCOM) OBJECT ORIENTED SYSTEM

(75) Inventor: Yi-Min Wang, Bellevue, WA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/137,907

(22) Filed: Aug. 21, 1998

Related U.S. Application Data

(60) Provisional application No. 60/057,358, filed on Aug. 25, 1997.

(51) Int. Cl.
*G06F 11/00* (2006.01)

(52) U.S. Cl. .............................. 714/38; 714/1
(58) Field of Classification Search .................. 714/38, 714/39, 41, 47, 48, 1
See application file for complete search history.

(56) References Cited

U.S. PATENT DOCUMENTS

| | | | |
|---|---|---|---|
| 5,892,946 A * | 4/1999 | Woster et al. ................ | 709/300 |
| 6,042,614 A * | 3/2000 | Davidson et al. .............. | 717/4 |
| 6,085,030 A * | 7/2000 | Whitehead et al. .... | 395/200.33 |
| 6,189,046 B1 * | 2/2001 | Moore et al. ................ | 709/315 |
| 6,212,556 B1 * | 4/2001 | Arunachalam .............. | 709/219 |

OTHER PUBLICATIONS

Y. Huang & C. Kintala, *Software Implemented Fault Tolerance: Technologies and Experience*, The Twenty-Third International Symposium on Fault-Tolerant Computing, IEEE Computer Society Press, Jun. 22-24, 1993.

D. Box, Q&A ActiveX/COM, Microsoft Systems Journal, Mar. 1997, pp. 93-105.

Y-Min Wang, Y. Huang, Kiem-Phong Vo, Pi-Yu Chung & C. Kintala, *Checkpointing and its applications*, The Twenty-Fifth International Symposium on Fault-Tolerant Computing, IEEE Computer Society Press, Jun. 27-30, 1995.

P.E. Ammann & J.C. Knight, *Data Diversity: An Approach to Software Fault Tolerance*, IEEE Transactions on Computers, v. 37, n. 4, Apr. 1988, pp. 418-425.

A. Avizienis, *The N-Version Approach to Fault-Tolerant Software*, IEEE Transactions on Software Engineering, v. SE-11, n. 12, Dec. 1985, pp. 1491-1501.

(Continued)

*Primary Examiner*—Dieu-Minh Le
(74) *Attorney, Agent, or Firm*—Morgan & Finnegan, LLP

(57) ABSTRACT

A method and system for improving reliability and availability in distributed computer applications. The method and system may be used in the context of primary-backup, failover recovery. The method involves software-fault tolerance using technique of structured storage; referral components; and wrappers. The method and system exploit the platform and operating system independence of component object models to allow the dynamic linkage of different component objects, the objects being resident on different inter-linked machines, based on the application requirements at any given point in time.

16 Claims, 16 Drawing Sheets

OTHER PUBLICATIONS

B. Randell, *System Structure for Software Fault Tolerance*, IEEE Transactions on Software Engineering, v. SE-1, n. 2, Jun. 1975, pp. 220-232.

E.N. Elnozahy, D.B. Johnson & Y.M. Wang, *A Survey of Rollback-Recovery Protocols in* Message-Passing Systems, NTIS ADA317250, Oct. 3, 1996.

* cited by examiner

METHOD AND SYSTEM FOR PROVIDING RELIABILITY AND AVAILABILITY IN A DISTRIBUTED COMPONENT OBJECT MODEL (DCOM) OBJECT ORIENTED SYSTEM

This invention claims the benefit to earlier filed provisional application Ser. No. 60/057,358, filed Aug. 25, 1997, titled: "RELIABILITY AND AVAILABILITY ISSUES IN DISTRIBUTED COMPONENT OBJECT MODEL (DCOM)"

FIELD OF THE INVENTION

This invention relates to client/server Distributed Component Object Model software architectures, and in particular to systems and methods for ensuring reliability, availability and recovery of Component Objects during and after failures in the distributed system.

BACKGROUND OF THE INVENTION

One widely accepted computer architecture, developed specifically to accommodate the "distributed computing" environment, is the client-server model. In its purest form, a client-server system consists of a central server (sometimes called the host), which is a very powerful computer (or cluster of computers that behaves as a single computer) that services the requests of a large number of smaller computers, or clients, that connect to it. The client computers never communicate with one another, instead exchanging data only with the server, which thereby acts as a clearinghouse for client requests and inter-client communications. A server, therefore, may be a large mainframe or minicomputer cluster, while the clients may be simple personal computers.

Although they need not be powerful, it is nonetheless important that clients possess a basic level of on-board processing capability; unlike older timeshare systems, which utilized "dumb" terminals that were essentially driven by the central machine, the client-server model requires that each client be capable of independent computational operation. In this way, the central server need only accept and deliver messages to the clients, which process them for output to the user. This approach limits the processing burden on the server and facilitates faster, readily customized responses by the clients.

An exemplary client-server configuration is illustrated in FIG. 1. A central server 10 communicates with a series of client computers 121, 122, 123, 124 . . . 12n over a coextensive series of physical connections 141, 142, 143, 144, . . . 14 n. The terms "server" and "host" are herein used interchangeably to denote a central facility consisting of a single computer or group of computers that behave as a single unit with respect to the clients. In order to ensure proper routing of messages between the server and the intended client, the messages are first broken up into data packets, each of which receives a destination address according to a consistent protocol, and which are reassembled upon receipt by the target computer. A commonly accepted set of protocols for this purpose are the Internet Protocol, or IP, which dictates routing information and the Transmission Control Protocol, or TCP, according to which messages are actually broken up into IP packets for transmission for subsequent collection and reassembly. TCP/IP connections are quite commonly employed to move data across telephone lines, and have been adopted not only by online services but throughout the worldwide, integrated network communication web known as the Internet.

The server executes a variety of applications in response to requests issued by clients. Within a typical client server architecture, however, most of these requests are for retrieval of information stored on one of the server's databases. The application programs executed by the server, therefore, by and large relate to data management and transfer. In this sense, the term "application" denotes a body of functionality for obtaining, processing and/or presenting data to a user. For example, electronic mail (e-mail) facilities allow the user to send and receive memo-type communications; document browsers display hierarchically organized collections of document titles, any of which can be obtained by a user simply by "clicking" on a title with a position-sensing mouse device or otherwise designating the document. Applications can be "active," operating only when affirmatively engaged by a user, or maintain a "background" task mode, which operates even when the application is not active.

Related to client server architectures, object-oriented programming divides monolithic applications into objects. In an object-oriented system, each object is associated with a unique identifier, and may or may not be represented by contiguously stored electronic data. Indeed, an item need not even reside on a single database; the server's database management software assembles an item (e.g., an article containing related text and image data) from its constituent components and transfers the item so that the user receives it as a single unit.

It is also possible to "encapsulate" procedures within the objects themselves, thereby reducing the programming burden on applications designed to interact with objects; those applications need not "know" the details of object management and display, since each object carries its own structure and effectively orchestrates its own behavior.

Objects also possess the property of "heritability," whereby properties or attributes of hierarchically superior objects are automatically inherited by hierarchically inferior objects. Heritability is managed by organizing the objects into classes, each of which represents the template for a set of similar (in the sense of sharing structure and behavior) objects. Each object is an instance of some class. Thus, objects in a subclass automatically acquire the procedures associated with hierarchically superior objects.

Hierarchical relationships among objects are not limited to inheritance and class. In addition, objects can be related to one another based on a hierarchical ranking, with higher-tier "parent" objects having pointers to lower-tier "children" objects. As a result, higher-tier objects behave as if they "contain" hierarchically related, lower-tier objects.

Objects can also be linked to one another. A linked object, while not contained in the linking object in the manner of a lower-tier object, is nonetheless referenced in the linking object. The procedures associated with the linking object determine the significance of the reference and its effect.

Management of object classes, attributes, encapsulated procedures and inter-object linkages typically occurs through an object-oriented database ("OODB") system, design and implementation of which are well-known in the art.

With typical client server architectures, an application may be divided between the client and the server, using object-oriented programs and each processor performing some part of an overall task. This separation may be used to optimize efficiency of the application, or to off-load processing to the client when the server resources are better applied to other tasks. While effective in typical client server architectures, this division of tasks between different processor resources becomes difficult when multiple client server systems are inter-connected. The interconnections may be dynamic and therefore not easily anticipated when the application is built. Further, different systems may operate with different operating systems, making resource sharing and cross-operating system object interaction difficult.

To accommodate the widely distributed nature of future computing, facilitated by wideband high-speed data interconnections, standards-based distributed architectures have evolved. One emerging standard for distributed objects is Distributed Component Object Model (DCOM). DCOM allows subdivision of monolithic client server applications into self-managing components or objects that interact with each other and freely move throughout a network and across operating system boundaries. By assembling these distributed components, in a dynamic manner, application developers quickly address specialized user needs without the requirement for building a monolithic application. With suitable standards, distributed objects become plug-and-play software components able to manage complex systems.

However, the dynamic behavior of DCOM introduces new challenges for building reliable distributed applications. Due to its desktop document processing origin, many DCOM application programming interfaces (APIs) are not structured and presented in an intuitive way for building distributed client/server applications. As a result, although the design of the DCOM architecture is quite extensible (that is, reasonable defaults are provided for common cases, but can be overwritten through flexible programming hooks), it often involves non-intuitive programming hacks to provide the functionality required in a client/server environment.

Before DCOM can be used to build mission-critical applications, there is a need to provide greater fault-tolerance and address reliability and availability issues for distributed objects.

SUMMARY OF THE INVENTION

The invention provides a method and system for improved reliability and availability of distributed component object models.

In one aspect, the invention provides enhanced software fault tolerance in Distributed Component Object Model with server object instances on multiple machines by maintaining a pool of server object instances running on multiple machines in a wrapper. Clients contact the wrapper to locate all said server object instances, and the wrapper receives and pre-processes the client request. The wrapper submits the request to the server and post-processes the server result before providing the post-processed server result to the client. The wrapper also dynamically transforms the client request when pre-processed using application-specific data transformations, and dynamically transforms the server result using application-specific data transformations.

This and other aspects of the present invention will be readily apparent to those of ordinary skill in the art after reading this description with reference to the accompanying figures and appended claims.

DETAILED DESCRIPTION

A. DISTRIBUTED CLIENT SERVER ARCHITECTURE

Figure 2:
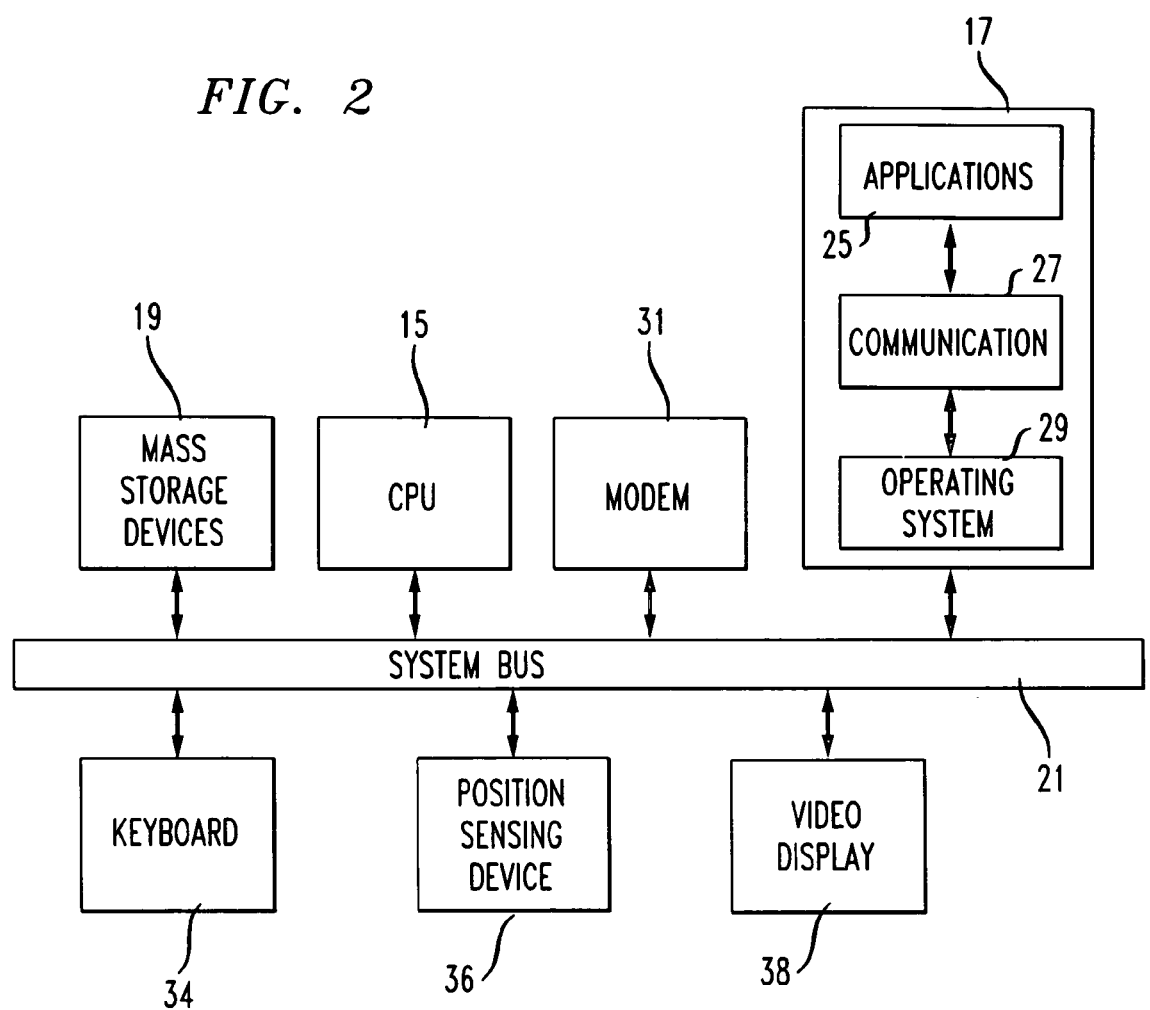
FIG. 2 illustrates components and operation of a computer system serving as either a client or server.

Refer first to FIG. 2, which illustrates generic computer circuitry representative both of clients and servers. The depicted computer system includes a central-processing unit 15, which performs operations on and interacts with a main system memory 17 and components thereof. System memory 17 typically includes volatile or random-access memory (RAM) for temporary storage of information, buffers, and portions of the computer's basic operating system. The system also includes at least one mass storage device 19, such as a hard disk and/or CD-ROM drive. All components of the system communicate over a bi-directional system bus 21.

While clients and servers bear similar hardware configurations at this level of generality, their relative processing and data-storage capabilities are naturally quite different. A client may be, for example, a personal computer running the Windows graphical user interface supplied by Microsoft Corp., while the server is ordinarily some type of mainframe or minicomputer cluster running several multi-platter hard drives and/or optical storage components as mass storage device 19.

In this application, the term machine is used and is intended to describe a piece of equipment with some form of central processor capable of executing instructions. When the term multiple machines is used, it is intended that it refer to more than one different piece of equipment, each machine with some form of central processor capable of executing instructions. The instructions would typically be in the form of software. However, while each machine may have some form of central processor capable of executing instructions, multiple machines may be inter-connected, such as via an intra-net or inter-net. Additionally, multiple machines may be of different types and capable of operating with different operating instruction sets. For example, without limiting the scope of the invention, one machine might operate under Windows, while another machine might operate under Unix. An advantage of COM and DCOM is that modules on different machines are able to inter-operate without regard to the different type of operating systems of different machines.

Figure 1:
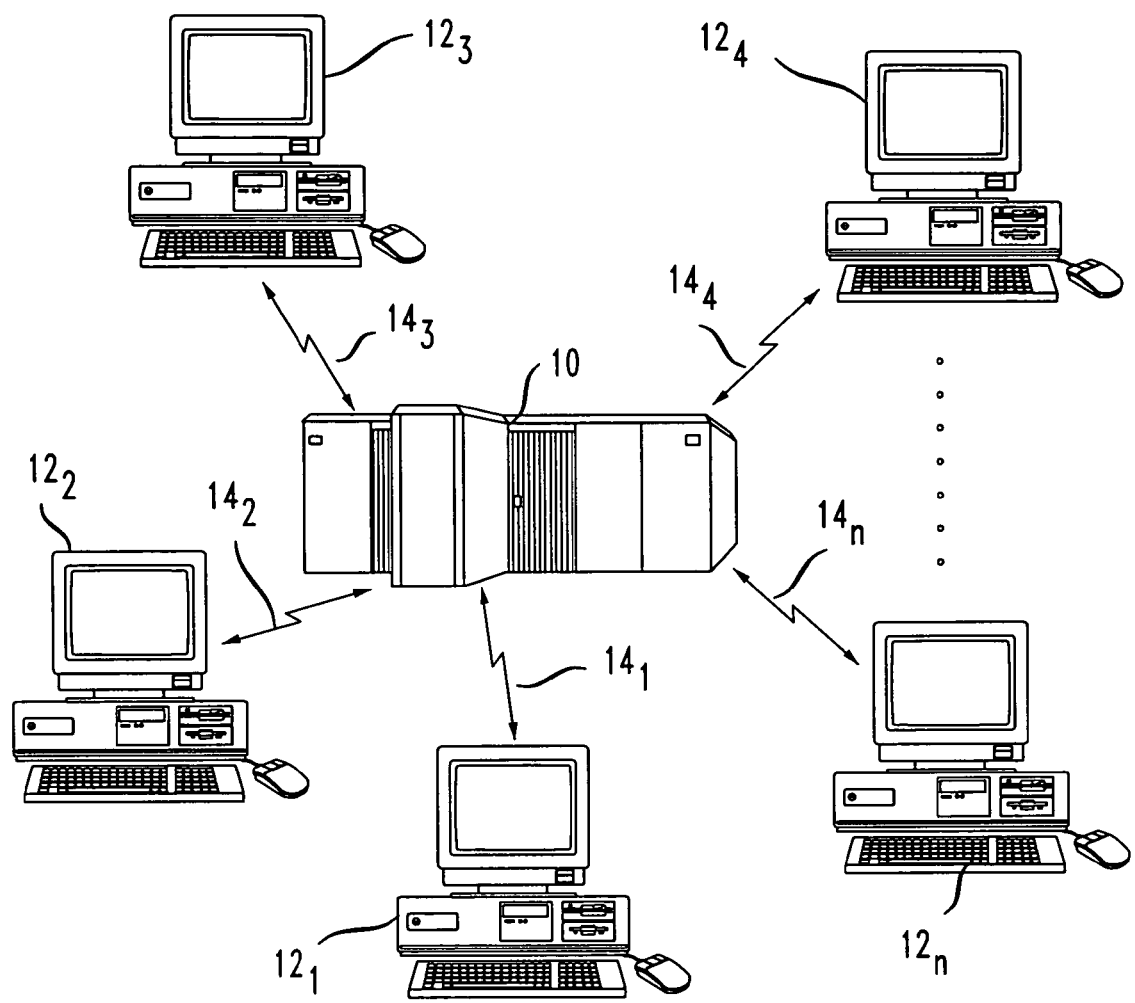
FIG. 1 illustrates a typical client server architecture.

System memory 17 contains, during operation, a series of applications 25 appropriate to the role the computer (10 in FIG. 1) is to play in the client-server system, a communication module 27 (preferably implementing TCP/IP) capable of transferring data among machines, and an operating system or graphical user interface 29. Communication module 27 drives a modem 31 or other data-transmission circuitry to transfer streams of digitally encoded data over telephone or other communication lines.

The user interacts with the system using at least one input device, preferably a keyboard 34 and a position-sensing device 36 (e.g., a mouse). The signal produced by either such device can be employed to designate information or select particular areas of a video screen display 38 (or other suitable device, such as a flat-panel display), over which the user observes the state of the system or, in the case of a subscriber, views requested information. Ordinarily, interactions between the user and applications 25 are managed through a suitable graphical user interface implemented by operating system 29 and appearing on display 38.

In operation, a subscriber (or "client user") employs a client computer as described above to communicate and interact with the server. The subscriber's connection to the host is established and maintained by a dedicated one of the applications 25, which sends and receives messages via the physical connection to the server sustained by communication module 27. The client effectively runs its own set of applications 25 as well as those on the server with which it interacts through message exchange.

Figure 3:
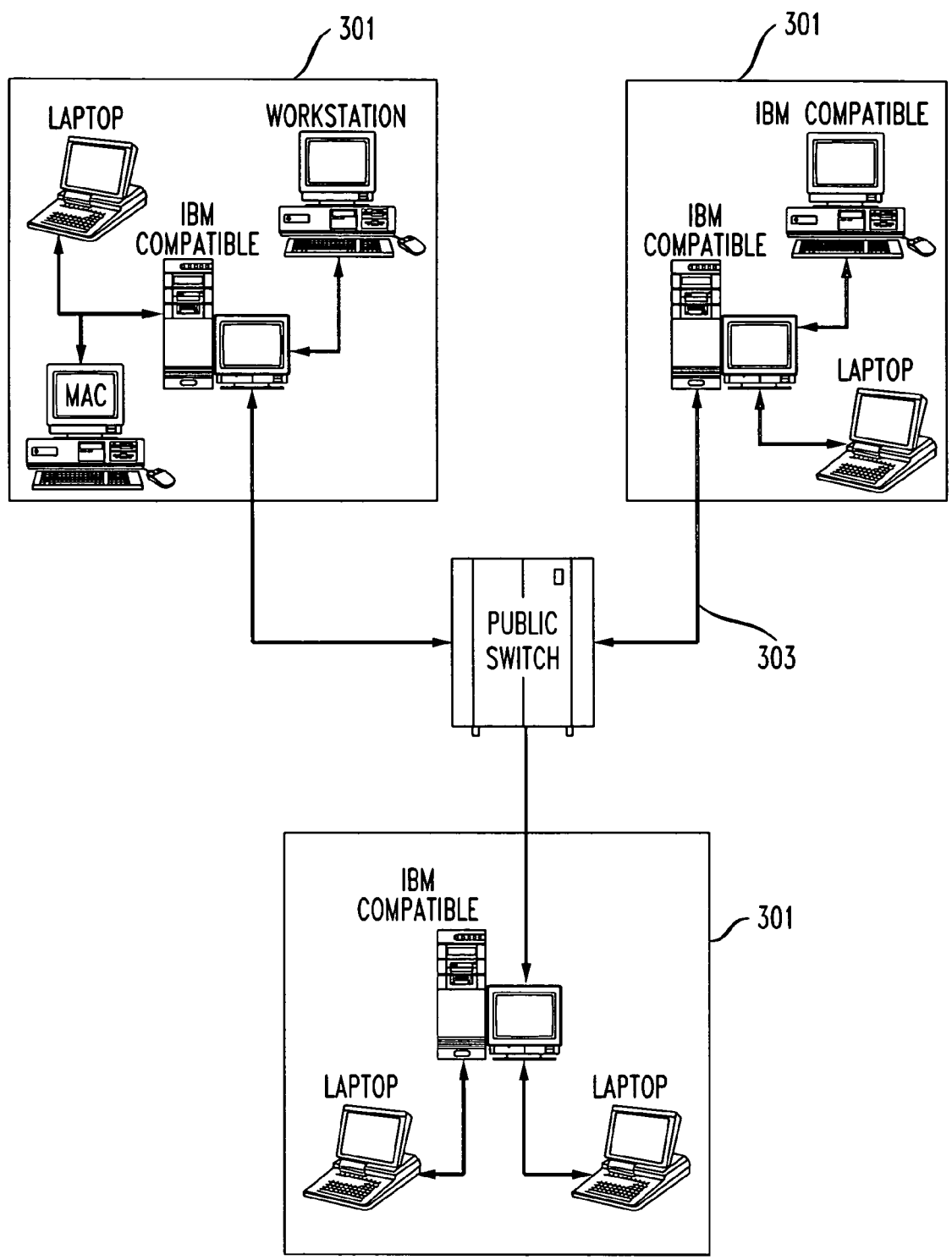
FIG. 3 illustrates multiple components and operation of multiple computer systems, each serving as either a client or server.

Referring now to FIG. 3, a distributed computing system may comprise multiple client server 301 systems that are suitably interconnected 303. The connections may be hard wire lines, such as T-1 or T-3 lines, or they may be dial-up lines on the PSTN. As such, the connections are subject to termination and disruption. Further, the different systems may run under different operating systems. Examples being OS-2, UNIX, Windows NT.

B. SOFTWARE ARCHITECTURE

In the component software architecture, applications are built from packaged binary components with well-defined interfaces. See e.g., D. Rogerson, *Inside COM*, Redmond, Wash.: Microsoft Press, 1996. It allows flexible update of existing applications, provides a higher-degree of application customization, encourages large-scale software reuse, and provides a natural migration path to distributed applications.

The Component Object Model (COM), is an approach to achieving component software architecture. It is described by Microsoft Corporation and Digital Equipment Corp., The Component Object Specification. COM specifies a way for creating components and for building applications from components. Specifically, it provides a binary standard that components and their clients must follow to ensure dynamic inter-operability. This enables on-line software update and cross-language software reuse. Though COM will be used as an example throughout this specification, other models are known and application of the present invention to those other models would be apparent to one of ordinary skill in the art after review of the description, figures and appended claims.

Distributed Component Object Model (DCOM) is the distributed extension of COM. For a description, see N. Brown and C. Kindel, *Distributed Component Object Model Protocol—DCOM*/1.0, Internet Draft, http://www.microsoft.com/oledev/olecom/draft-brown-dcom-vl-spec-01.txt, November 1996. It is an application-level protocol for object-oriented remote procedure call (ORPC). The DCOM protocol is layered on top of the OSF DCE RPC specification, with a few extensions. See the OSF DCE RPC Specification at: http://www.osf.org/mall/dce/free_dce.htm, 1994. For example, OSF DCE RPC specifies how pointers to remote objects are represented and how they can be resolved to find the actual objects. Effectively, DCOM transparently extends the capabilities and benefits of COM to a networked environment. Though DCOM will be used as an example throughout this specification, other models are known and application of the present invention to those other models would be apparent to one of ordinary skill in the art after review of the description, figures and appended claims.

DCOM is now part of the MicroSoft Windows NT 4.0 operating system. As a result, there are plans by several companies to port DCOM to mainframes (such as IBM MVS) and various versions of Unix (such as Solaris, Digital Unix, and HP-UX) to ensure inter-operability in a heterogeneous environment. DCOM is also part of the ActiveX Core Technologies that are being standardized by a software consortium called the Active Group. For a description of that activity, see ActiveX Core Technologies Description, http://www.activex.org/announce/ActiveX_Core_Technologies.htm.

C. OVERVIEW OF DCOM

In COM, an executable (EXE) or a dynamic link library (DLL) can serve as an object server. A server can implement class factories for multiple classes, each of which is identified by a 128-bit globally unique identifier (GUID), called the class identifier (CSLID). Each class factory can create object instances of a particular CLSID. An object can support multiple interfaces, each representing a different view or behavior of the object. Each interface is identified by a GUID, called the interface identifier (IID). An interface usually consists of a set of functionally related methods. A COM client interacts with a COM object by acquiring a pointer to one of the object's interfaces, and invoking methods through that pointer.

Figure 11:
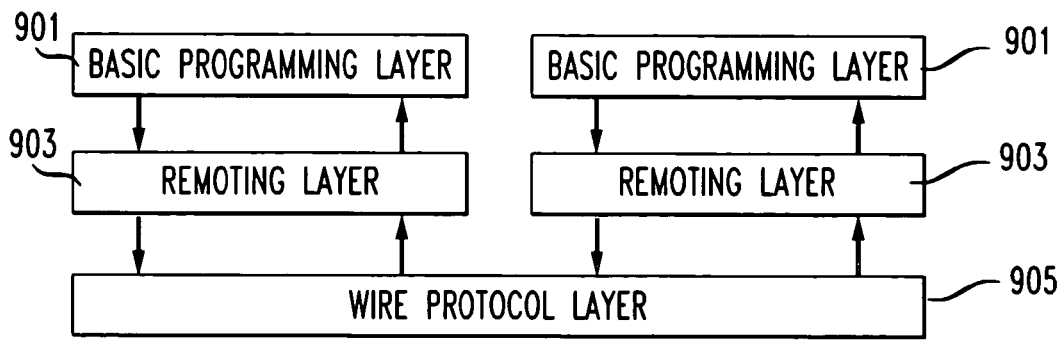
FIG. 11 illustrates different layers as used for distributed systems.
Figure 12:
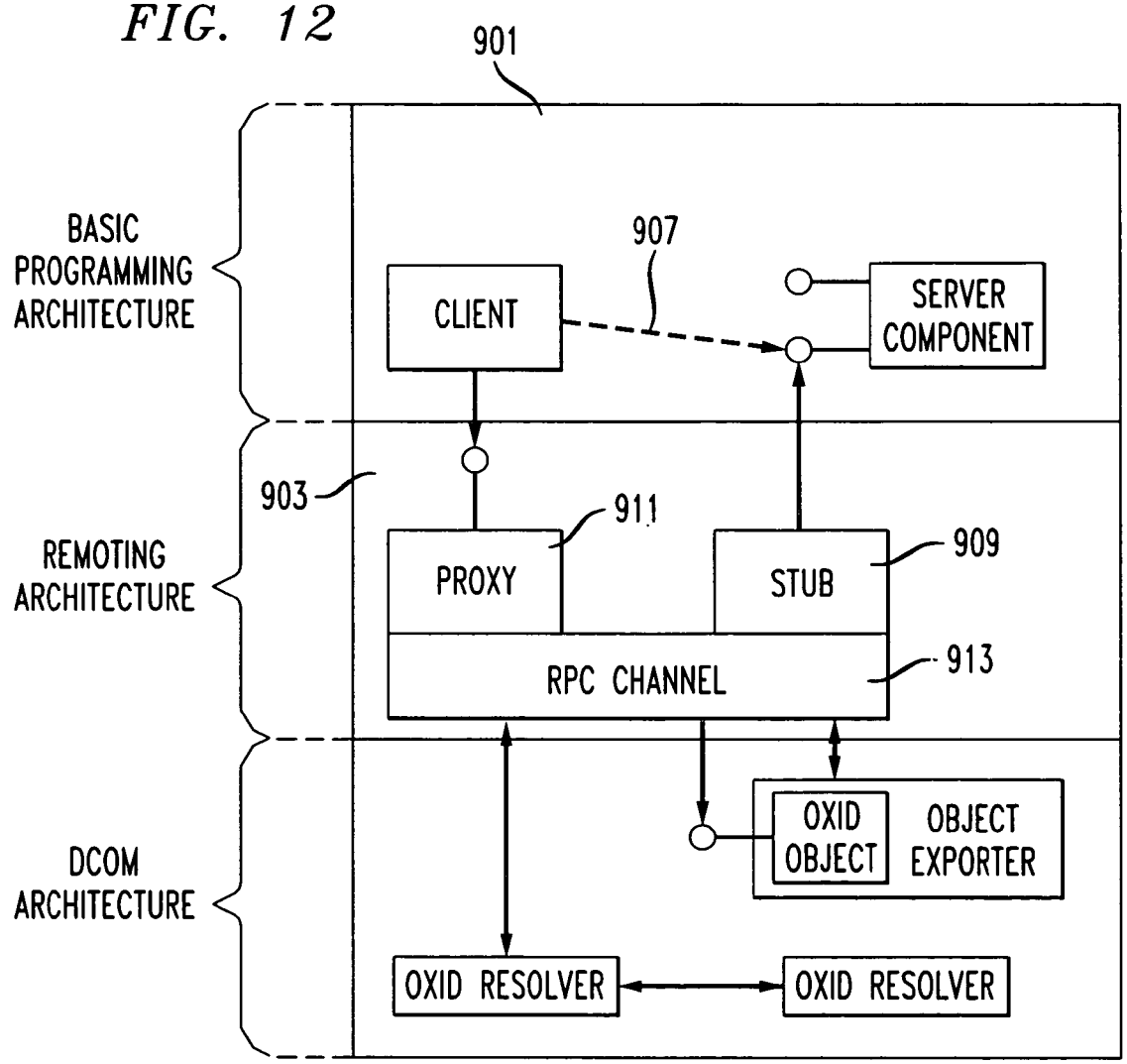
FIG. 12 illustrates different architecture layers as used for distributed systems.

Referring to FIGS. 11 and 12, the overall architecture of DCOM can be divided into three layers: basic programming layer 901, remoting layer 903, and the wire protocol layer 905. At the basic programming layer, the client is provided with the illusion 907 that it is always invoking methods on objects running in the same address space. The remoting layer consists of the COM infrastructure that provides that illusion. The wire protocol describes what are actually transmitted across the network when objects do not reside on the client machine.

At the basic programming layer, the client specifies a CLSID and an IID to obtain an interface pointer. The server, upon being activated by the COM infrastructure, creates and registers all supported class factories. A method on the class factory of the requested CLSID is invoked to create an object instance and return a pointer to the interface of the requested IID. The client can then invoke methods of that interface, or navigate to other interfaces of the same object.

Figure 4:
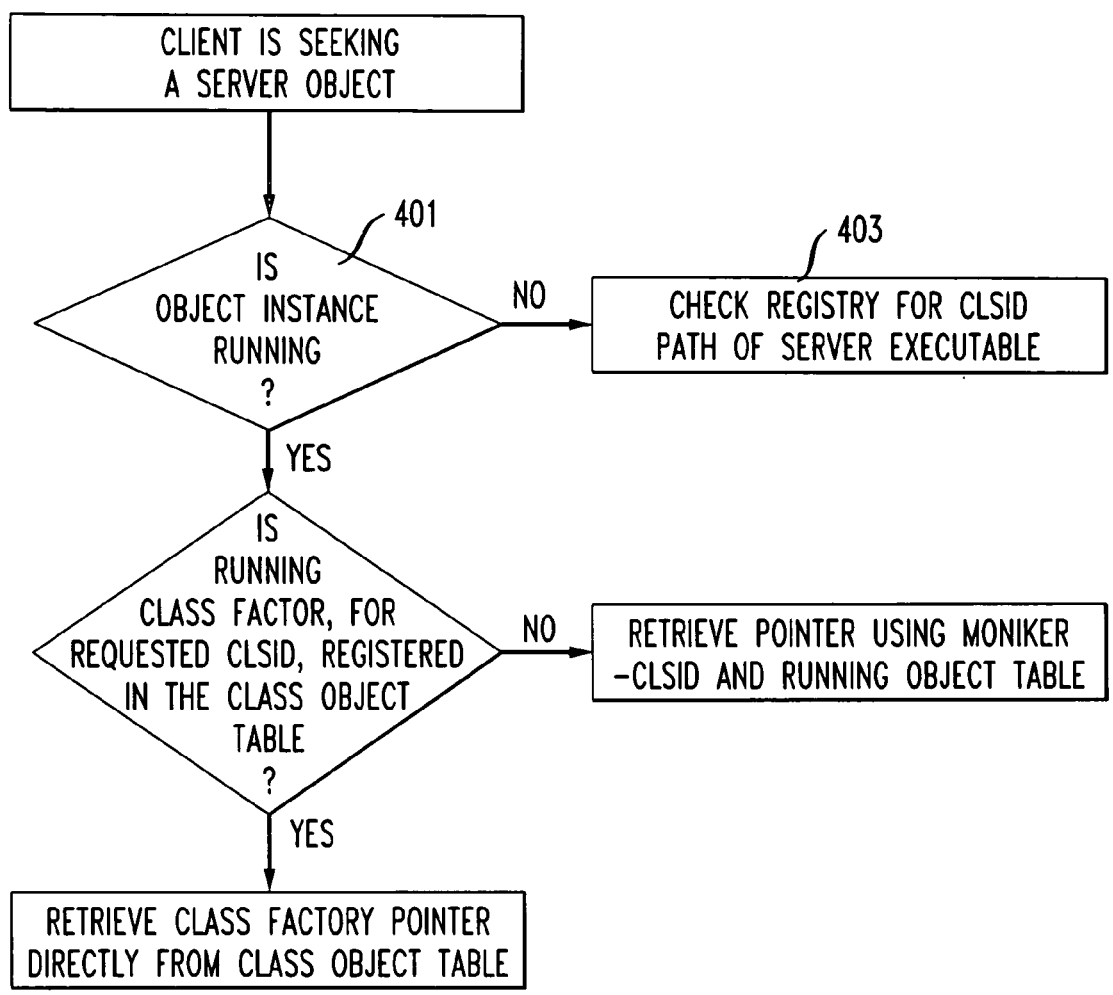
FIG. 4 illustrates a typical process for locating a server object.

Referring to FIG. 4, upon receiving an activation request from the client, the Service Control Manager (SCM) at the remoting layer checks to see if the client can attach to a running class factory 401. If not, it locates the server implementation through the registry 403, and activates the server.

Referring to FIGS. 11 and 12, in the process of returning an interface pointer to the client, a server-side stub 909 and a client-side proxy 911 are created, connected by an RPC channel 913. When the client invokes a method, the proxy marshals the parameters, and sends the request to the stub. The stub unmarshals the parameters, invokes the actual method on the object, marshals the return values, and replies back to the proxy which unmarshals the values and hands them back to the client.

At the wire protocol layer, the client-side SCM performs remote activation by invoking an RPC interface method on the server-side SCM. The wire-level representation of a returned interface pointer includes a server identifier, the address of the resolver that can translate the identifier to the actual server endpoint, and an interface pointer identifier that uniquely identifies the interface instance within that server. Upon unmarshaling the interface pointer, the client-side RPC subsystem requests the resolution of the server identifier, and caches the returned endpoint information for future method invocations. The parameters and return values of method invocations are marshaled in the Network Data Representation (NDR) format.

D. EMBODIMENTS OF THE INVENTION

There are at least three main approaches to fault tolerance; checkpointing and message logging, virtual synchrony, and transaction. They are described in: Y. Huang and C. Kintala., *Software implemented fault tolerance: Technologies and experience*, in Proc. IEEE Fault-Tolerant Computing Symp., pp. 2–9, June 1993; E. N. Elnozahy D. B. Johnson, and Y. M. Wang, A survey of rollback-recovery protocols in message-passing systems. Tech. Rep. No. CMU-CS-96-181, Dept. of Computer Science, Carnegies Mellon University, 1996 (also available at http.://www.research,.att.com/~ym-wang/papers/surveyCR.htm); K. P. Birman, *Building Secure and Reliable Network Applications*, Greenwich, Conn.: Manning Publications Co., 1996; and J. Gray and A. Reuter, *Transaction Processing: Concepts and Techniques*, San Mateo, Calif.: Morgan Kaufmann, 1993.

Some distributed systems may be characterized as primary-backup systems which may or may not have an underlying clustering software (such as Wolfpack, described in *Clustering Solutions for Windows NT*, Windows NT Magazine, pp. 54–95, June 1997.) for providing the failover of system resources such as IP addresses, shared disk, etc. Complete application failover in such systems generally involves the primary server checkpointing its critical data for use by the backup; the client locating the backup server upon a failure, and issuing a re-connection; the server executing a different piece of code if software bugs seem to be the cause of the failure. When planning to use DCOM on these systems, certain challenges arise.

1. Data Checkpointing

A stateful server application usually needs to checkpoint its critical data during normal execution so that, upon a failure, the backup server can recover as much pre-failure state as possible from the checkpoint. In a cold backup scheme, the checkpoint is periodically saved on a shared disk, and the backup is activated to reload that checkpoint only upon a failover. In a warm backup scheme, the checkpoint is transferred to the memory of an initialized backup. In both cases, message logging can be employed as a form of incremental checkpointing to improve performance.

COM-based server applications introduce several challenges to the problem of checkpointing. In a traditional monolithic application, the main program is totally in charge of declaring and checkpointing all critical data. This may not be an easy task when unknown critical data inside imported libraries are present. This difficulty becomes the normal case in component-based applications in which reused components may constitute a large percentage of the total amount of code. Therefore, COM defines a set of standard interfaces (the IPersist* family) that components can expose to provide data persistence. This allows the knowledge about the critical data of each component to be encapsulated inside the component itself. The application simply queries each constituent component for one of the standard interfaces, and asks the component to checkpoint itself. To allow critical data from all constituent components to be saved in the same file, COM supports the concept of "a file system within a file", called structured storage. Structured storage is described generally by: D. Chappell, *Understanding ActiveX and OLE*, Redmond, Wash.: Microsoft Press, 1996. Structured storage also supports a transacted mode that can be used to ensure either the checkpoint operations of all components succeed, or none of them takes effect. Another challenge in checkpointing DCOM applications is that COM objects come and go due to the inherently dynamic nature of the model. As a result, the issue of tracking and identifying those objects that are still active also needs to be addressed.

Figure 13:
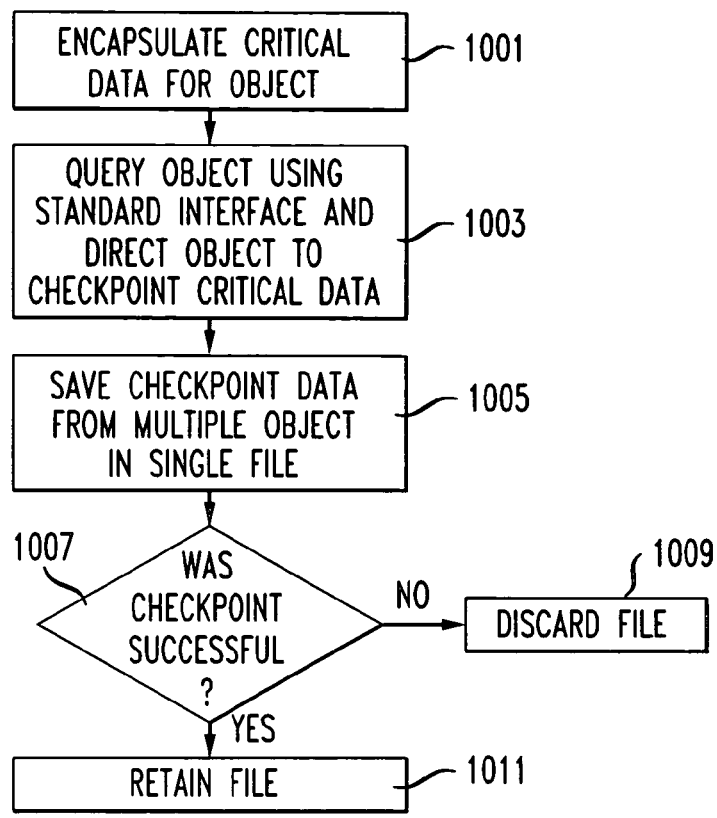
FIG. 13 illustrates checkpointing according to the invention.

Referring to FIG. 13, distributed checkpointing is illustrated. To allow fault recovery, critical data for each object is encapsulated 1001, within the object; then to facilitate distributed checkpointing, each object is queried, using a standard interface and directed to checkpoint the critical data 1003. This checkpoint data from multiple objects is saved in a single file 1005, with verification that the checkpoint was successful 1007. If the checkpoint operation failed, the file is discarded 1009. Otherwise, the checkpoint file is retained 1011.

Figure 5:
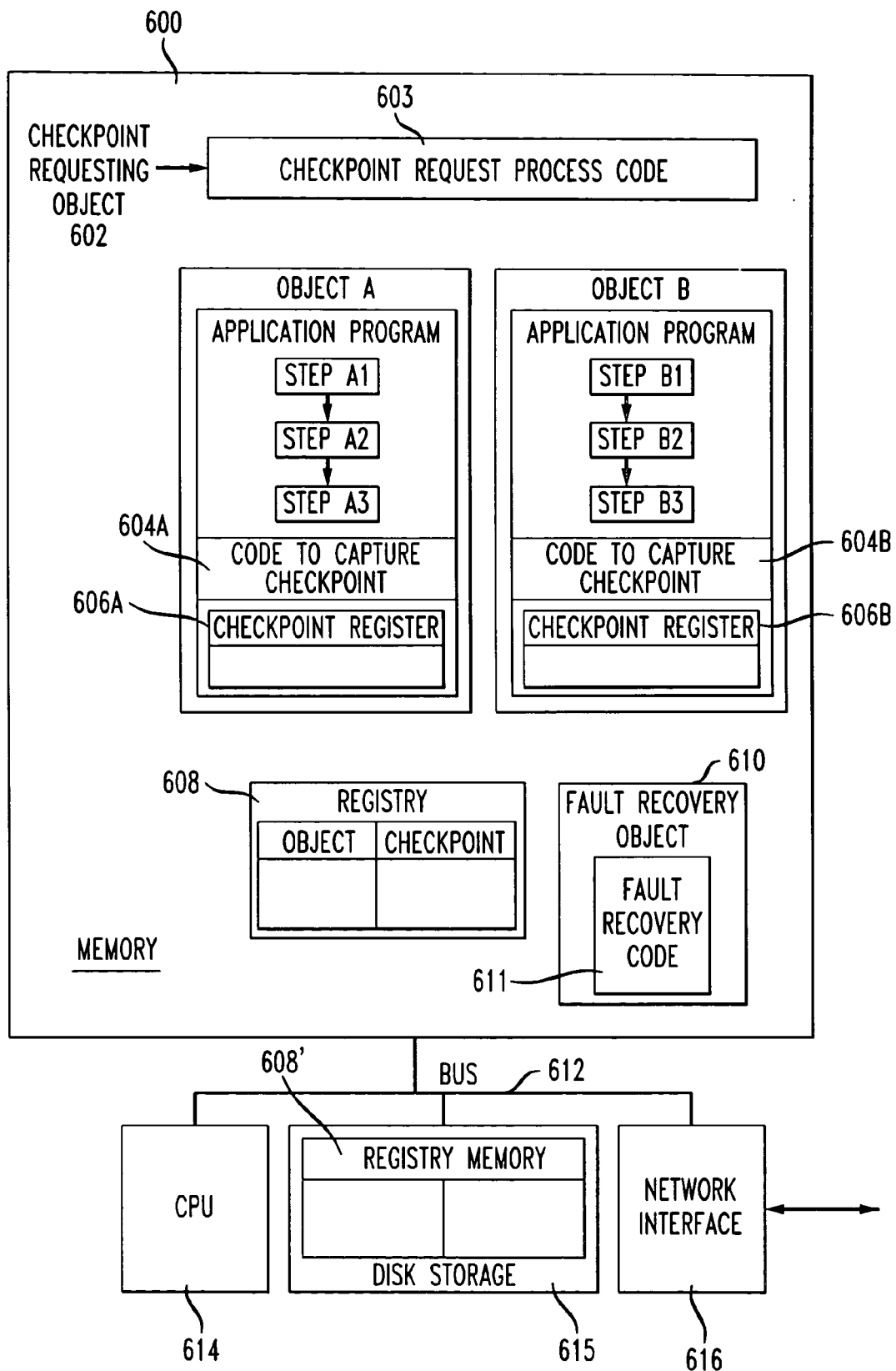
FIG. 5 illustrates the relationship between different components for a checkpointing operation on a single machine.
Figure 6:
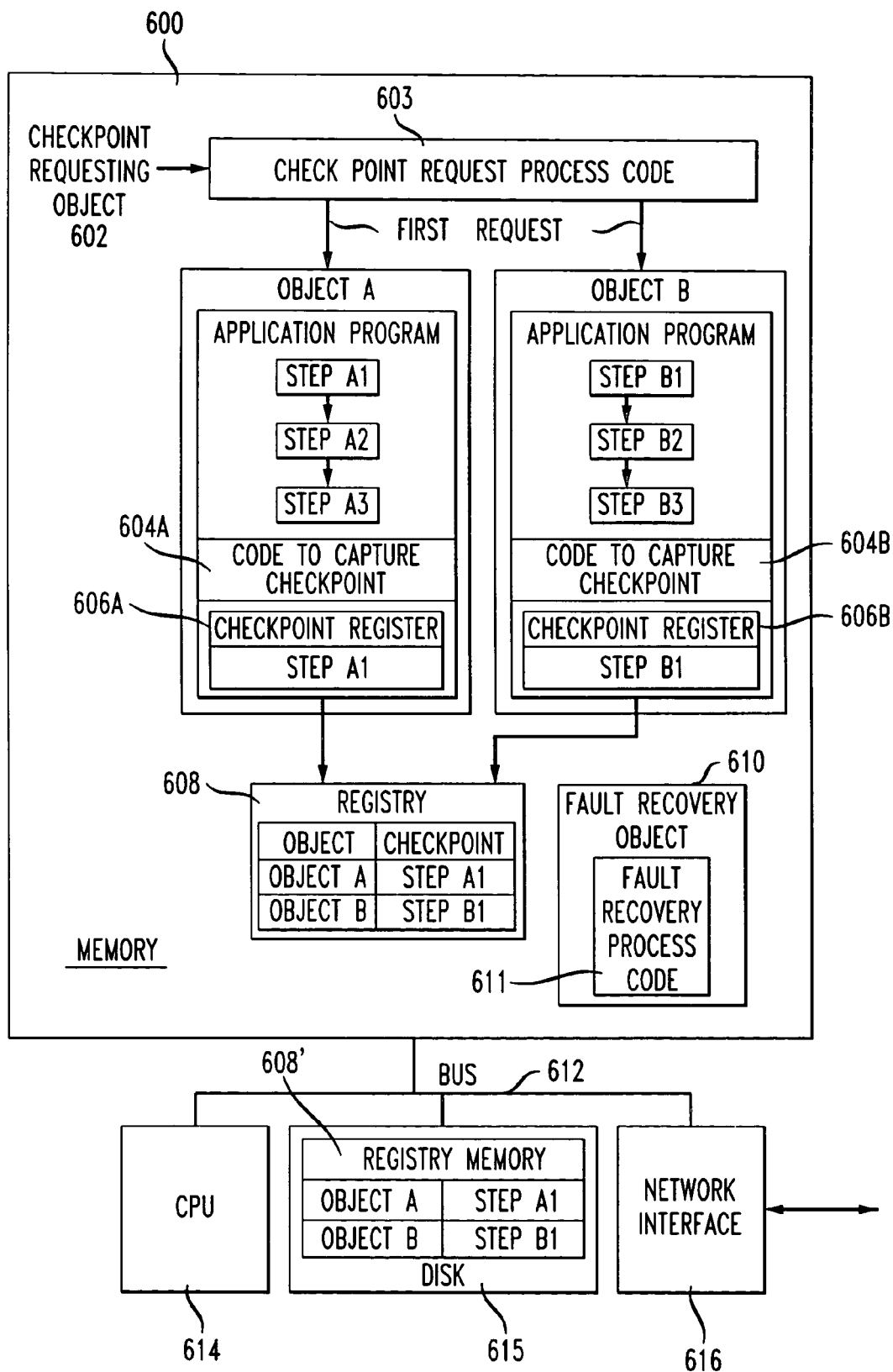
FIG. 6 illustrates a first checkpointing operation on a single machine.
Figure 7:
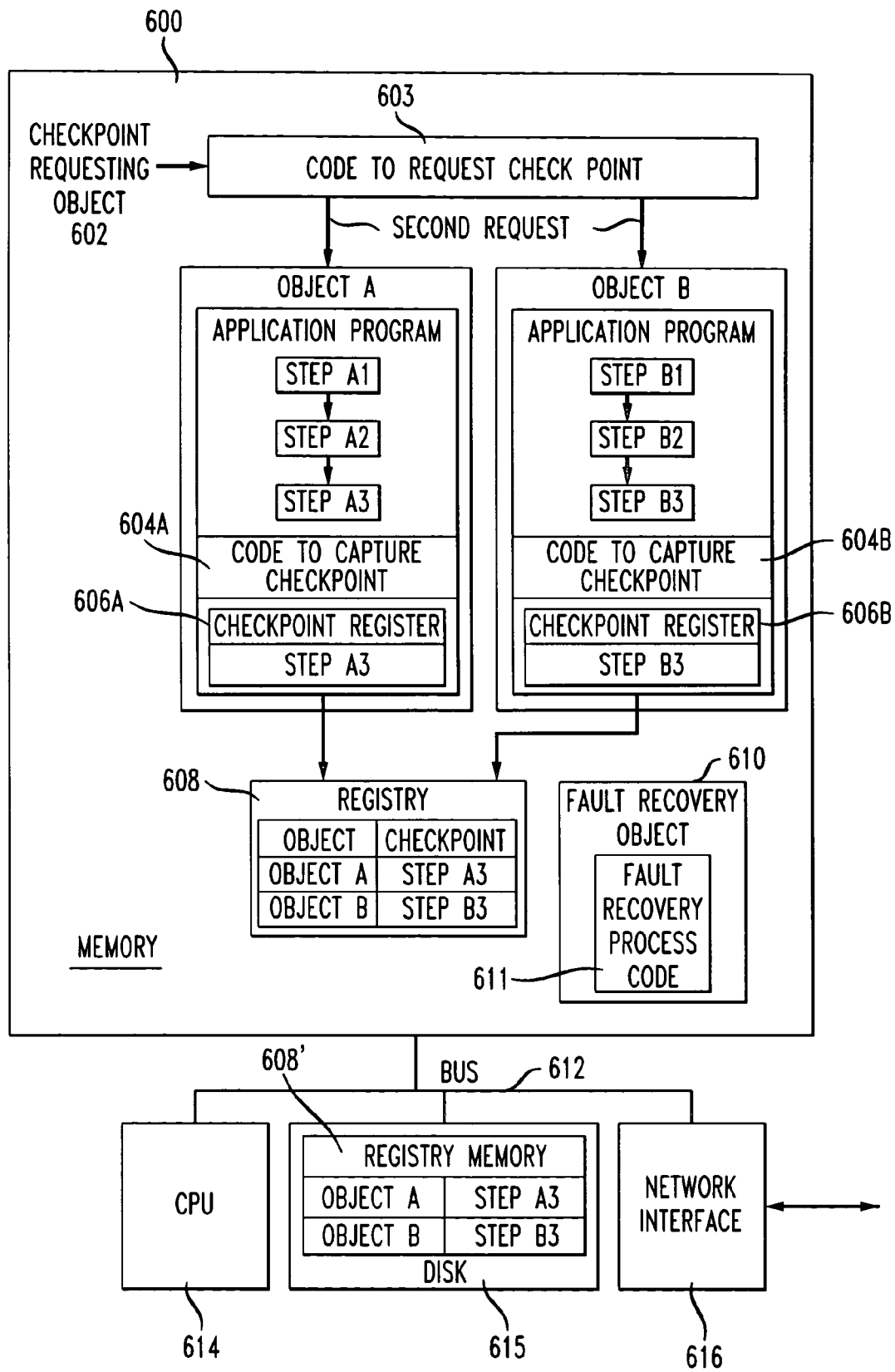
FIG. 7 illustrates a second checkpointing operation on a single machine.

Referring now to FIGS. 5, 6 and 7, distributed checkpointing is illustrated in greater detail. A distributed system will embody multiple objects running within the memory 600 of a single computer system. The computer system uses a data bus 612 to communicate between the memory, central processor unit (CPU) 614, on-line disk storage 615 and network interface 616 components.

To provide data checkpointing for the application, a checkpoint request object 602 implements code to request a checkpoint 603. This request is made of all running objects within the system. When the checkpoint request is received by a running object, the object, or application, implements internal code to capture a checkpoint 604A and 604B. This object checkpoint is stored in a checkpoint register 606A and 606B, for each running object.

The checkpoints for all running objects are also stored in a central registry 608 of the computer system. These checkpoint registers 606A, 606B and 608 are within volatile memory 600 and are therefore subject to loss if there is any power interruption. To provide for enduring checkpointing, the system also stores the checkpoint in non-volatile disk storage 615 within registry memory 608'. The registry memory 608' is a mirror of registry 608, and provides a backup in the event that registry 608 is unavailable for fault recovery.

Referring now to FIGS. 6 and 7, two successive checkpoint operations are illustrated. In FIG. 6, a first checkpoint request is generated by the check point request process code 603. This request is sent to each running object. When each object receives the request, the object determines the current application step, and captures that information as a checkpoint, using internal object code 604A and 604B. This information is stored within the object checkpoint register 606A and 606B. The checkpoint information is also stored in the system registry 608 and image 608', which provides a central record of all checkpoints for the system. When a subsequent checkpoint request is generated by the check point request process code 603, the request is again sent to each running object. When each object receives the subsequent request, the object determines the current application step, and again captures that information as a checkpoint, using internal object code 604A and 604B. This new information is stored within the object checkpoint register 606A and 606B, overwriting the previous checkpoint. The new checkpoint information is also stored in the system registry 608 and image 608'.

Figure 8:
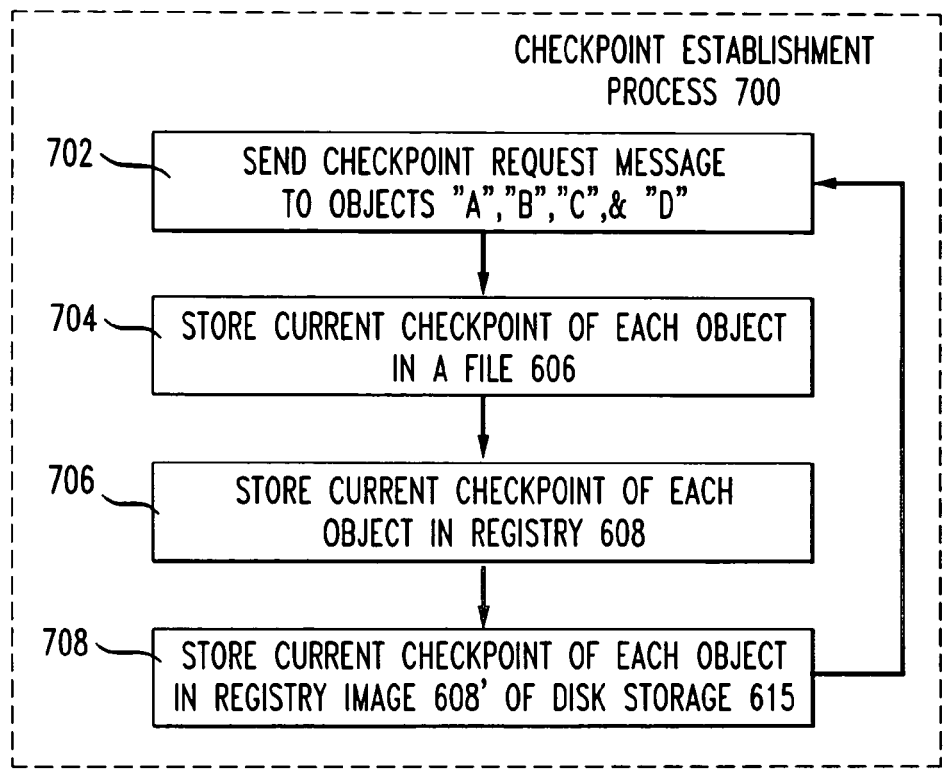
FIG. 8 illustrates the steps for checkpointing of multiple machines.
Figure 9:
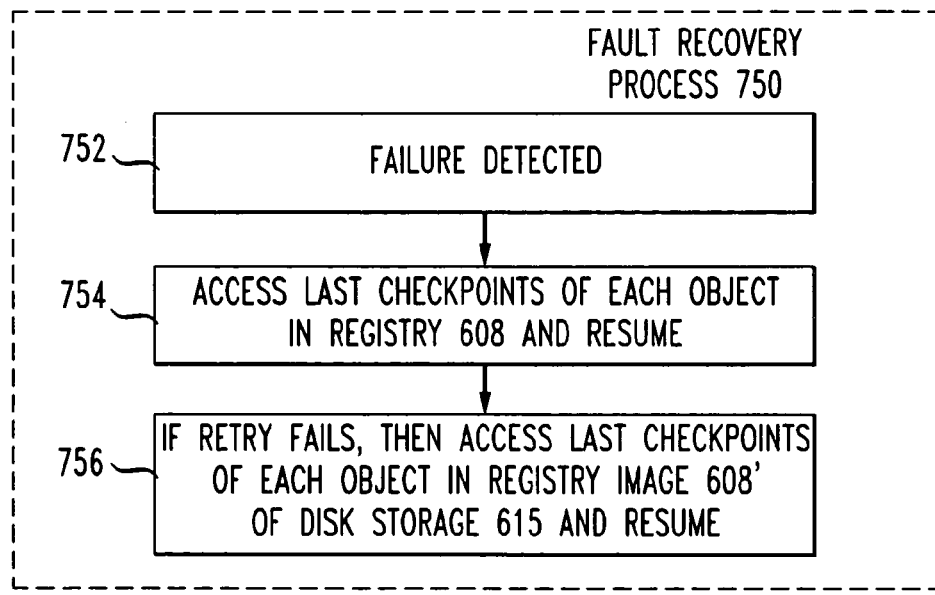
FIG. 9 illustrates fault recovery for distributed systems in the present invention.
Figure 10:
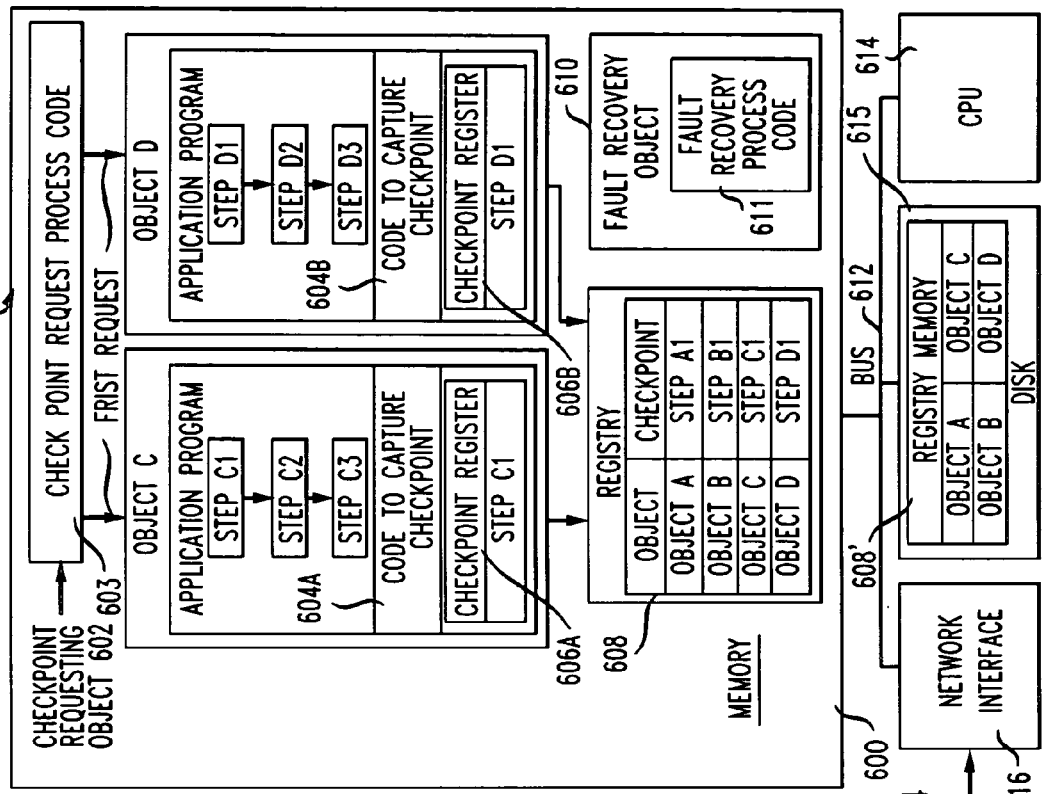
FIG. 10 illustrates checkpointing for multiple machines in a distributed system.
Figure 10:
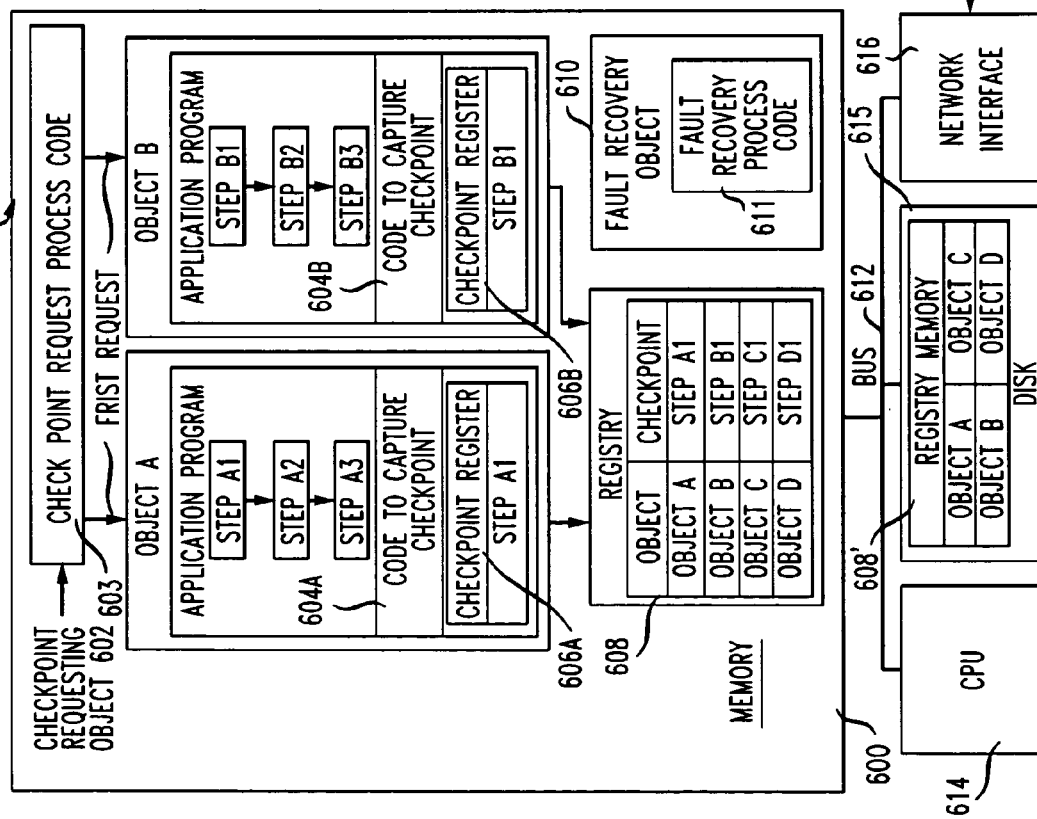

Referring to FIGS. 8 and 10 together, when multiple systems are connected by a network 804, a checkpoint establishment process generates 700 a distributed checkpoint request message, which is sent 702 to all objects running on the network. After receiving the request, each running object stores 704 a current checkpoint in a file 606 and also stores 706 the checkpoint in the register 608 of their system, while storing 708 the checkpoint as an image 608' on the disk storage medium 615.

Using this extensive checkpointing scheme, a distributed system is able to quickly recover after a failure. Referring to FIGS. 5, 6, 7, 9 and 10 together, in the event of a fault or failure, requiring recovery, a fault recovery object 610 running on each system is able to execute fault recovery process code 611. This fault recovery process 750 detects 752 a failure somewhere within the distributed system, and directs each system and object to access 754 the last checkpoints of each object in registry 608, and resume the application. If the application is unable to restore based on the checkpoint stored in the registry 608, the application accesses the image checkpoint 608' that is stored on disk 615, and resumes. In the event that one network node 801 is unable to resume using either the registry 608 or the image registry 608', the image at the other network node 802 is available over the network 804 for fault recovery.

2. Object Locator

Object locator is used by COM clients to find the desired primary server objects, as well as to locate the backup server objects upon a failure. COM provides several locator-related services. Another aspect of the present invention is integration of these services into a single naming service for locating COM objects, and integration with other general-purpose, standard naming services.

The most well-known object locator in COM is the registry. It maps CLSID (or a readable name called Prog ID) to the path name of the server executable that supports the CLSID. However, the registry is consulted only after the SCM has failed to locate any running object instance. There are at least two ways for a client to bind to a running instance. First, if a running class factory for the requested CLSID has been registered in the class object table, SCM retrieves the class factory pointer directly from the table without activating a new server instance. Alternatively, a specific object instance can be named by using a moniker. A moniker is itself a COM object supporting the IMoniker interface. Moniker is described generally at: D. Chappell, *Understanding ActiveX and OLE*, Redmond, Wash.: Microsoft Press, 1996; and D. Box, *Q&A ActiveX/COM*, Microsoft Systems Journal, pp. 93–108, July 1997. Each moniker specifies a CLSID and identifies the persistent data for an instance of the that CLSID. By registering a moniker with the Running Object Table (ROT), an object instance allows clients requesting that moniker to attach to it. ROT is described at: Microsoft Corporation and Digital Equipment Corp., *The Component Object Specification*, http://www.microsoft.com/oledev/olecom/title.htm, October 1995.

A higher-level object locator service can be implemented using the referral (or broker) components. Referral components are described at: DCOM Technical Overview, http://www.microsoft.com/windows/common/pdcwp/htm.

Figure 14:
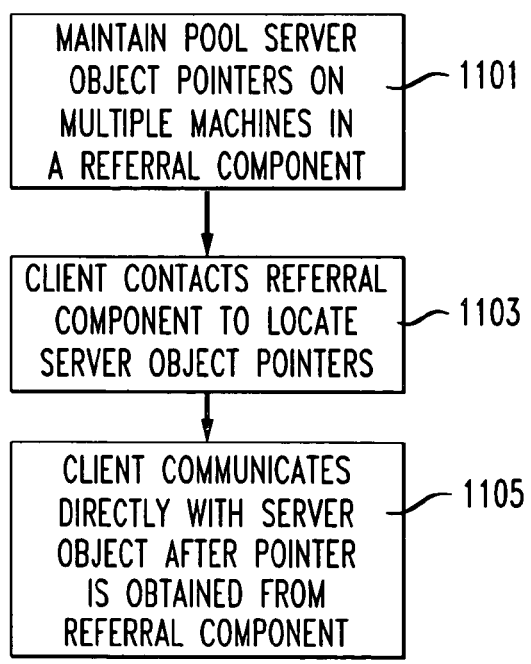
FIG. 14 illustrates a referral component of the invention.

Referring to FIG. 14, a referral component manages a pool of interface pointers to object instances possibly running on different machines 1101. It can support a naming scheme as well as perform failure detection and load balancing. In such an architecture, a client always contacts 1103 the referral component to get access to an initial interface pointer to a server object. The underlying distributed object support of DCOM allows the client to talk to the object directly 1105 in subsequent invocations, without passing through the referral component.

3. Client Re-Connection

There are two approaches to enabling automatic client re-connections upon a server failure: toolkits and wrappers. Toolkits and wrappers are described at: K. P. Birman, *Building Secure and Reliable Network Applications*, Greenwich, Conn.: Manning Publications Co., 1996. In the first approach, client programs link with a toolkit and invoice special APIs to make connection. This is described at: Y. Huang and C. Kintala., *Software implemented fault tolerance: Technologies and experience*, in Proc. IEEE Fault-Tolerant Computing Symp., pp. 2–9, June 1993. In the second approach, source code-transparent wrappers intercept normal connection requests sent by the clients, and issue re-connections when a failure occurs. As further explained below, the dynamic behavior and extensible architecture of DCOM facilitate the implementation of dynamic wrappers that allow the server objects to decide when to apply which wrappers based on run-time information.

As described previously, when a client requests an interface pointer, which server object it will eventually bind to depends on several table-lookup operations. It is therefore possible to manipulate the mapping information in those tables at run-time to dynamically change the application behavior. For example, one can provide a wrapper component by using COM's containment or aggregation technology. This containment or aggregation technology is more fully described at: D. Rogerson, *Inside COM*, Redmond, Wash.: Microsoft Press, 1996.

Figure 15:
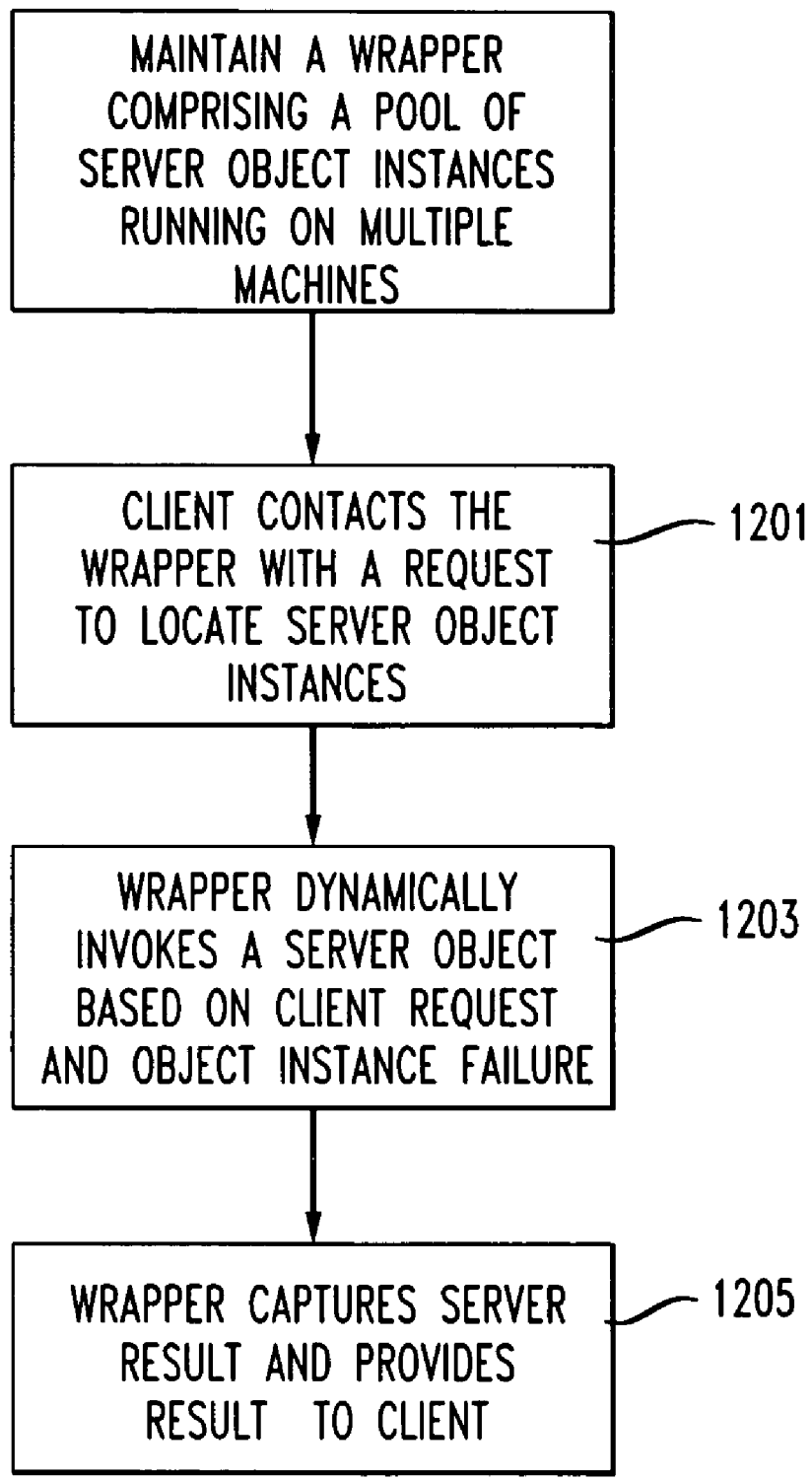
FIG. 15 illustrates a wrapper of the invention.
Figure 16:
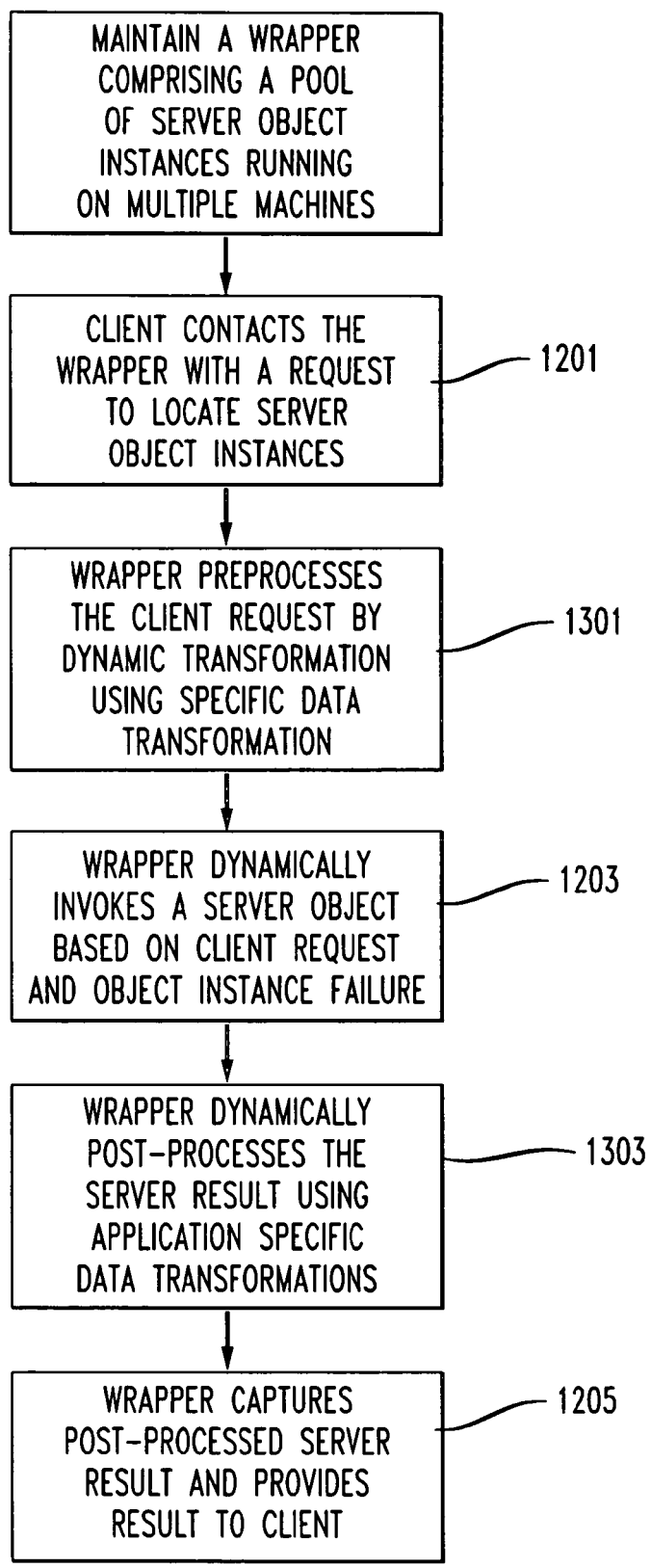
FIG. 16 illustrates a wrapper of the invention.

Referring to FIGS. 15 and 16, containment technology allows the wrapper to receive a client request 1201, perform pre-processing 1301, invoke the actual server component 1203, perform post-processing 1303 and then provide the results back to the client 1205. Aggregation technology allows changing application behavior adding additional interfaces that the client or the COM infrastructure may query. Wrappers can be injected into the system by either modifying the registry settings, or placing mappings in the class object table or ROT to bypass registry lookups.

Server objects themselves can also decide which wrapper to inject by using a technique called custom marshaling. The concept of custom marshaling is described at: K. Brockschmidt, *Inside OLE*, Redmond, Wash.: Microsoft Press, 1993; and D. Box, *Q&A ActiveX/COM*, Microsoft Systems Journal, pp. 93–105, March 1997. The marshaling architecture described in the previous section is called the standard marshaling: data passing between the server and the client are marshaled into a standard format in a standard way. Standard marshaling is actually a special case of the more general custom marshaling. By supporting the IMarshal interface, a server object indicates that it wants to establish proprietary communication with the client-side proxy, and so the COM infrastructure should not create the standard proxy/stub pair. That interface allows an object to specify the CLSID of the proxy that should run on the client side and can interpret the custom marshaling packet. Custom marshaling is commonly used for caching immutable objects on the client side to efficiently support read operations locally. It can also be useful for injecting dynamic client-side fault-tolerance agents for issuing re-connections. Customs marshaling is one of many examples that demonstrate the extensibility of the DCOM architecture. It can also be used to support the Quality-of-Service (QoS) concept by dynamically deciding which custom proxy code to download based on a client's identity, where different custom proxies provide different "qualities" of fault-tolerance services.

Figure 17:
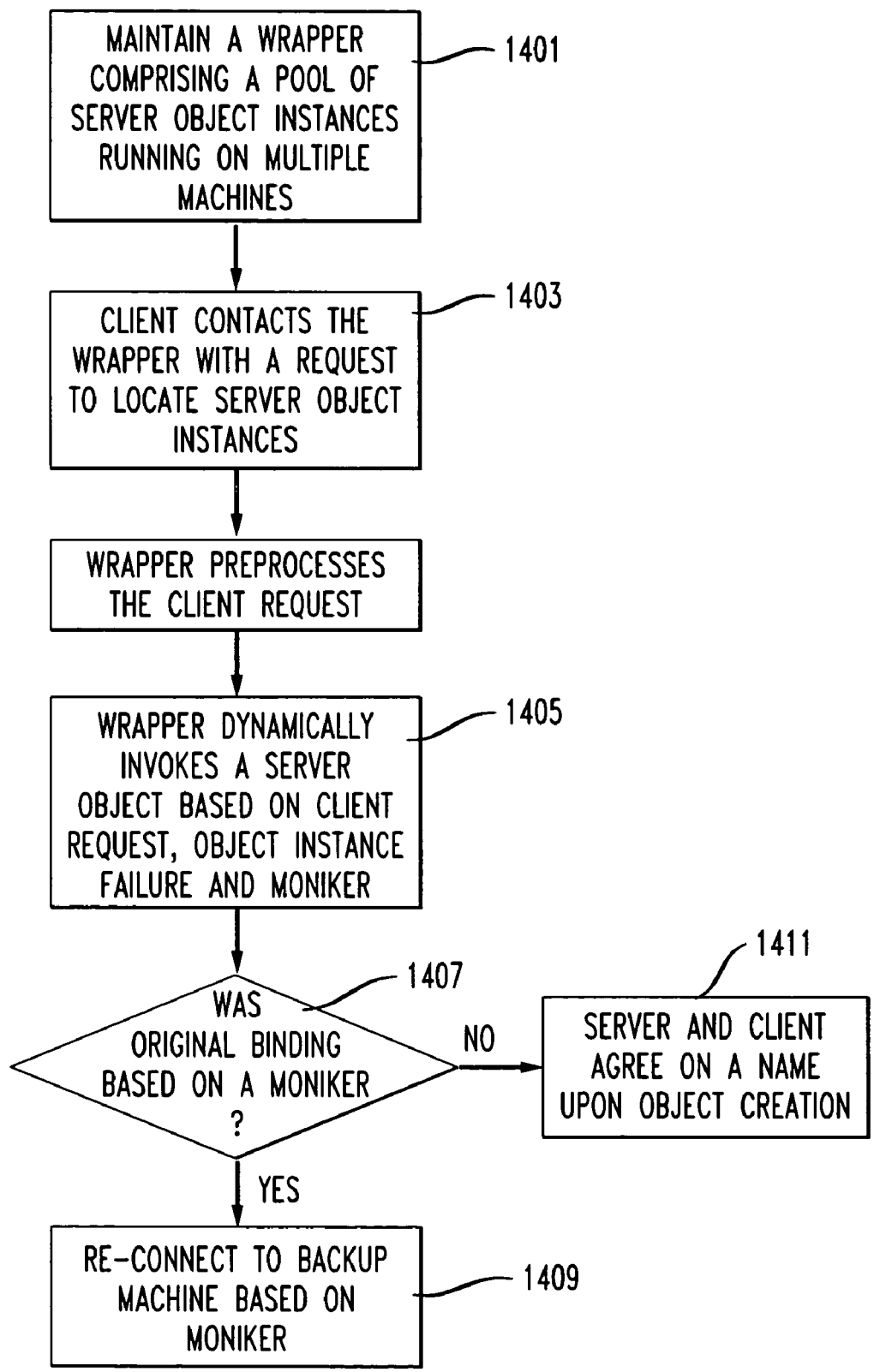
FIG. 17 illustrates a re-connection of the invention.

Referring to FIG. 17, when there is a failure or fault, a wrapper issues a re-connection and needs a locator for finding the correct backup server object. By maintaining a pool of server object instances running on multiple machines 1401, the wrapper can require that a client contact the wrapper to locate server objects 1043. If the original binding to the primary server object was based on a moniker 1407, a similar binding call can be made to the backup machine 1409 for re-connection. If the original connection was made to a fresh instance of a particular (CLSID), then a separate mechanism 1411 must be provided to allow the server object and the client to agree on a name upon object creation.

4. Software-Fault Tolerance

In general, there are three approaches to tolerating software bugs. The simplest one is the environment diversity approach, which re-executes the same program with the same set of input but in a different environment. Environment diversity is described at: Y. M. Wang, Y. Huang, K. P. Vo, P., Y. Chung, and C. Kintala, *Checkpointing and its application*, in Proc. IEEE Fault-Tolerant Computing Symp., pp. 22–31, June 1995; and Y. M. Wang, Y. Huang, and W. K. Fuchs, *Progressive retry for software error recovery in distributed systems*, in Proc. IEEE Fault Tolerant Computing Symp., pp. 138–144, June 1993. Usually, environment diversity can be achieved by following the same failover procedure for recovering from hardware failures.

Another approach to software-fault tolerance is the data diversity approach, which executes the same program on a transformed but consistent set of data. Data diversity is described at: P. E. Ammann and J. C. Knight, *Data diversity: An approach to software fault-tolerance*, IEEE Trans. Computers, Vol. 37, No. 4, pp. 418–425, April 1988. Data diversity can be implemented by the containment wrappers described previously, where pre-processing and post-processing consist of application-specific data transformations.

The third approach to software-fault tolerance is the design diversity approach, which executes a different program or programs implementing the same functionality. Design diversity is described generally at: A. Avizienis, *The N-Version approach to fault-tolerant software*, IEEE Trans. Software Eng., Vol. SE-11, No. 12, pp. 1491–1501, December 1985; and B. Randell, *System structure for software fault tolerance*, IEEE Trans. Software Eng., Vol. SE-1, No. 2, pp. 220–232, June 1975. In the N-version approach, the application is designed to run N-versions of a program either simultaneously or in parallel. Each of the N-versions is intended to implement the same functionality, but owing to the difference in their individual program structure, there is only a small probability that more than one version will experience an error at the same time. To ensure consistent error-free results, the N-versions regularly vote using their respective results, (e.g. compare the results against each other) and if any one of the N-versions provides a different result (e.g., the minority result) from the other N-versions (e.g., the majority result) that minority version is presumed to have produced an error and the result of the minority version is discarded or ignored. In this manner, with a suspected error, the main application program does not need to re-execute the same data on another program. However, this N-version approach has the disadvantage that it requires more processor resources to run the N-versions and is further limited in speed to that of the slowest version, based on the need to constantly vote or compare results.

An alternative approach assumes that the main application program will be informed of or recognize an error by one version of the program module and the main application program shifts to an alternative module or version after the error is recognized. This approach has the advantage of greater processing speed while using minimal resources, but all module versions must be in existence and well characterized when the main application is created. The main application must also be robust in the ability to either select alternative modules based on the error, or sequentially try alternative modules until it appears that an error-free result is obtained.

Despite the disadvantages, design diversity is a very important tool where very high reliability is required (as in the manned space program) or where avoiding a fatal system error and avoiding the associated crash is more important than the programming and processor overhead expense of maintaining alternative versions. However, design diversity has not been widely used for other than mission critical applications, most probably because building multiple versions is costly and the individual versions may still share similar kinds of software bugs.

The COM architecture makes design diversity practically useful in the component software architecture. First, interface specifications are what COM is all about. By strictly separating interfaces from implementations, COM encourages different implementations of the same interfaces. In other words, the existence of multiple versions supporting the same functionality should actually be the normal case in COM. Moreover, by asking each component to register which component categories (i.e., which sets of interfaces) it supports, it is possible to standardize the procedure of invoking an alternate upon a failure, and provide a toolkit to hide all the registry query and update activities. The rules that COM clients must specify a globally unique identifier when requesting an interface, and that an interface is immutable once it is assigned an identifier, ensure that an alternate must unambiguously support the interfaces that a client wants. Finally, COM's language neutrality allows the same interfaces to be implemented in different programming languages. This has the potential of greatly improving the effectiveness of design diversity. For example, a memory corruption error in a component implemented in a language that supports pointers would not appear in another component written in a language with no pointers.

Figure 18:
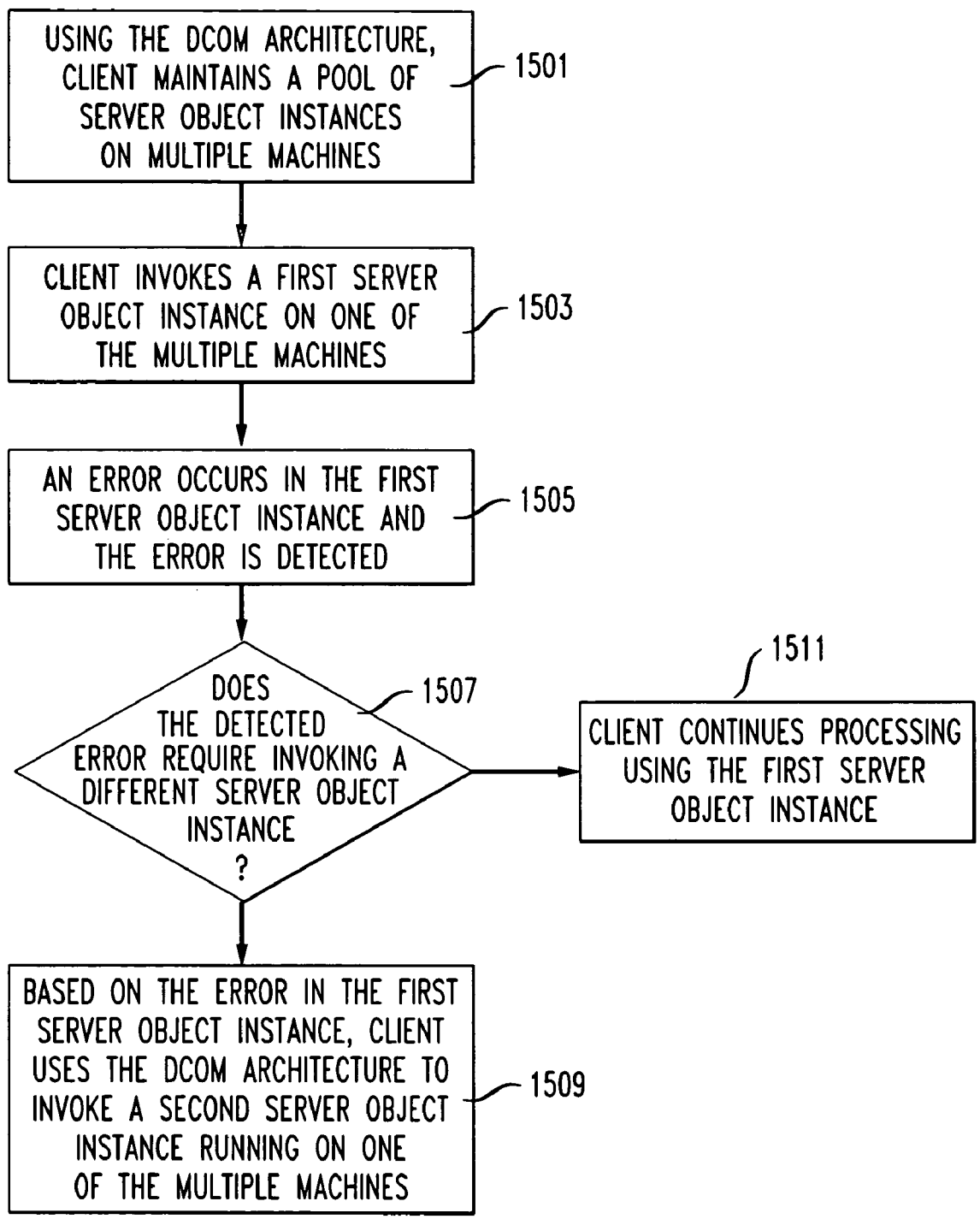
FIG. 18 illustrates an embodiment of design diversity using DCOM.

Thus, application of COM in the area of design diversity will be particularly advantageous, allowing rapid reconfiguration and more robust error-free applications. Referring to FIG. 18, one embodiment of the present invention is illustrated. In this embodiment, the client maintains a pool of different server object instances 1501 and, based on a need for that functionality, invokes one of those server object instances 1503. Once invoked, the server object instance operates normally until an error occurs 1505. When an error occurs in the server object instance, either the server object instance itself may detect and report the error to the client, or the client itself may detect the error in the server object instance. Regardless of the method for detecting and reporting the error, once the client is informed of the error in the server object instance, it determines 1507 whether the error is significantly serious to require invoking a different server object instance 1509, or whether the error is minor and the currently invoked server object instance may continue 1511. If the error is significant and a different server object instance is required, the client identifies another server object instance from the pool of server object instances and invokes the new server object instance to replace the first server object instance that generated the error 1509.

Figure 19:
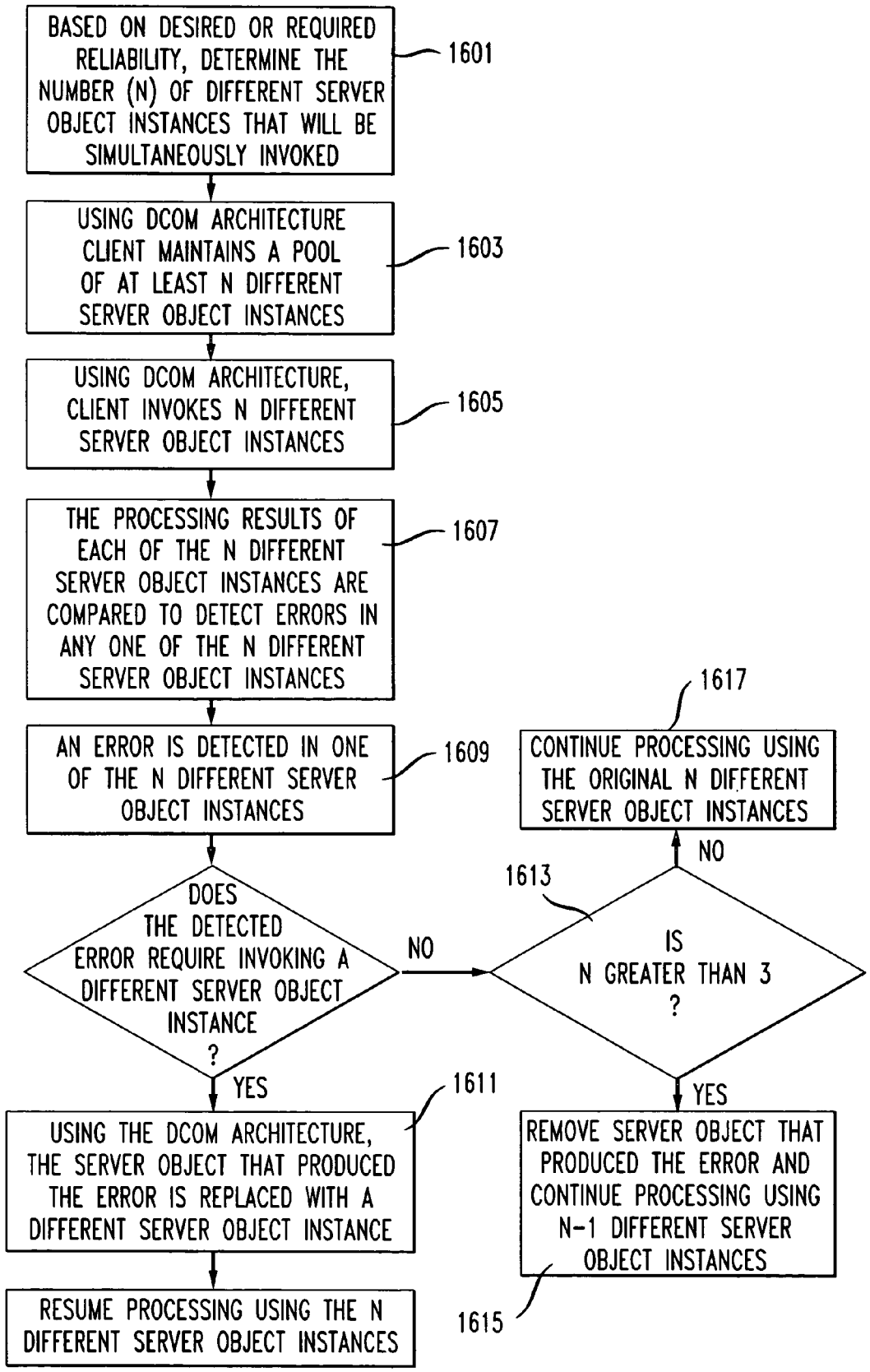
FIG. 19 illustrates an embodiment of design diversity using DCOM.

Referring to FIG. 19, another embodiment of the present invention is illustrated, where N-versions of server objects run simultaneously. In this embodiment, the required number (N) of different server object instances is determined 1601. This determination is performed as known in the field of reliability and will most likely be based on the statistical probability of error in one server object, with consideration for the overall required reliability that must be achieved. Other considerations will include the available processor resources and the required application speed or efficiency. For this approach, N must generally be three (3) or greater to allow different server objects to "vote" and determine whether one has produced a minority result. Once the required number (N) is determined, the client develops and maintains a pool of at least N different server objects suitable for accomplishing the required task 1603. The client then invokes the required N different server objects 1605, which may be on different machines, and simultaneously manages their operation, while comparing 1607 the output or results of each of the N different server object instances. Once the N different server object instances are invoked, the client operation is similar to that already known with N-version. However, when an error occurs 1609, the present invention offers the client an option, not available with traditional N-version. In this option, the server object that produced the error may be readily replaced 1611 with another server object from the pool that is maintained by the client. In this manner, the client may eliminate or replace a server object that is error prone, or update a server object with a new object that has corrected the error source, or may be faster. Alternatively, if N is greater than three (3) 1613, the server that produced the error may be removed without replacement 1615 and the process continued. If N is three (3), the server that produced the error may not be removed without replacement 1617, therefore it must remain or the N-version will no longer function as intended. In this manner, the advantages of the DCOM architecture allow the high reliability of N-version with the ability to substitute different server objects when one of the server objects is less than satisfactory.

In the description, different server objects on different machines have been described. However, it is to be understood that one machine may have multiple server objects and it is further understood that a client need not necessarily invoke a server object from a machine that is different from the client (e.g. the client may invoke a server object on the same machine as the client). The inventive aspect is that the DCOM architecture allows the client to maintain a pool of different server objects that may be readily substituted in a dynamic fashion without the need for existence of the server object at the time the client application is written or implemented.

In the example of design diversity, this will allow a client to operate with an N-version approach, but without the need for having or fully knowing about each of the N-versions at the time the client application is written. Use of the DCOM architecture also allows a ready substitution of different versions of the N-version based on updates or errors that occur in one of the N-versions.

In another example of design diversity, this will allow a client to maintain better fault tolerance, recovery and restart.

What is claimed is:

1. A method for enhanced software fault tolerance in a Distributed Component Object Model comprising the steps of:
    a client maintaining a pool of server object instances on multiple machines;
    the client invoking a first server object instance from the pool with a client request until an error occurs in the first server object instance; and
    determining whether the error is minor and continuing the first server object instance or if the error is significant the client invoking a second server object instance from the pool based to replace the first server object instance in processing the client request.

2. The method of claim 1 wherein the error by the first server object instance is identified by the first server object instance.

3. The method of claim 1 wherein the error by the first server object instance is identified by the client.

4. A system for enhanced software fault tolerance in a Distributed Component Object Model comprising:
    a first server object instance from the pool with a client request until an error occurs in the first server object instance; and
    a determining program module which determines whether the error is minor and continuing the first server object instance or if the error is significant the client invokes a second server object instance from the pool to replace the first server object instance in processing the client request.

5. The system of claim 4 wherein the error by the first server object instance is identified by the first server object instance.

6. The system of claim 4 wherein the error by the first server object instance is identified by the client.

7. A method for enhanced software fault tolerance in a Distributed Component Object Model comprising the steps of:
    determining a number (N) of different server object instances required to achieve a desired reliability or availability of a client;
    maintaining a pool of at least N different server object instances on multiple machines; and
    invoking N different server object instances from the pool; and
    determining whether the error is minor and continuing the first server object instance or if the error is significant the client invoking a second server object instance from the pool based to replace the first server object instance in processing the client request.

8. The method of claim 7 further comprising the steps of:
    identifying an error produced by one of the N different server object instances; and replacing the server object instance that produced the error with another server object instance from the pool.

9. The method of claim 7 wherein the error is identified by one of the N different server object instances.

10. The method of claim 7 wherein the error is identified by the client.

11. The method of claim 7 further comprising the steps of:
comparing processing results of the N different server object instances to detect errors in any one of the N different server object instances;
determining that an error was produced by one of the N different server object instances; and
removing the server object instance that produced the error, if N is three or greater.

12. A system for enhanced software fault tolerance in a Distributed Component Object Model comprising:
a client;
a pool of at least N different server object instances on multiple machines, wherein N different server object instances are required, the client maintains the pool, and the client invokes the N different server object instances from the pool to provide software fault tolerance;
a comparing program module which compares processing results of the N different server objects to detect errors in any one of the N different server object instances; and
a determining program module for determining whether the error is minor and continuing the first server object instance or if the error is significant the client invoking a second server object instance from the pool based to replace the first server object instance in processing the client request.

13. The system of claim 12 wherein
the determining program module determines that an error was produced by one of the N different server object instances whereby the server object instance that produced the error is removed from the system, if N is three or greater.

14. A system for enhanced software fault tolerance in a Distributed Component Object Model comprising:
a client;
a pool of at least N plus one different server object instances on multiple machines,
wherein N different server object instances are required, the client maintains the pool, the client invokes N different server object instances from the pool, one of the N server object instances produces an error and the client invokes another server object instance from the pool as a replacement for the server object instance that produced the error;
a detecting program module which detects whether one of the N server object instances produces an error whereby the client invokes another server object instance from the pool as a replacement for the server object instance that produced the error; and
a determining program module for determining whether the error is minor and continuing the first server object instance or if the error is significant the client invoking a second server object instance from the pool based to replace the first server object instance in processing the client request.

15. A system for enhanced software fault tolerance in a Distributed Component Object Model comprising:
a client;
a pool of at least N plus one different server object instances on multiple machines, wherein N different server object instances are required;
an error identifying program module which enables the client to identify an error produced by one of the N different server object instances whereby the client invokes another server object instance from the pool as a replacement for the server object instance that produced the error; and
a determining program module for determining whether the error is minor and continuing the first server object instance or if the error is significant the client invoking a second server object instance from the pool based to replace the first server object instance in processing the client request.

16. A system for enhanced software fault tolerance in a Distributed Component Object Model comprising:
a client;
a pool of at least N plus one different server object instances on multiple machines, wherein N different server object instances are required, the client maintains the pool, the client invokes N different server object instances from the pool, and
an error identifying program module which enables one of the N different server object instances to identify an error produced by one of the N different server object instances whereby the client invokes another server object instance from the pool as a replacement or the server object instance that produced the error; and
a determining program module for determining whether the error is minor and continuing the first server object instance or if the error is significant the client invoking a second server
object instance from the pool based to replace the first server object instance in processing the client request.

* * * * *